United States Patent [19]

Gardner et al.

[11] Patent Number: 4,555,175

[45] Date of Patent: Nov. 26, 1985

[54] MEASURING COMPRESSION OF CABLED OPTICAL FIBERS

[75] Inventors: William B. Gardner, Atlanta; Parbhubhai D. Patel, Dunwoody; Dan L. Philen, Atlanta; Manuel R. Santana, Doraville, all of Ga.

[73] Assignee: AT&T Bell Laboratories, Murray Hill, N.J.

[21] Appl. No.: 475,620

[22] Filed: Mar. 15, 1983

[51] Int. Cl.$^4$ .............................................. G01B 11/02
[52] U.S. Cl. ..................................... 356/32; 356/73.1
[58] Field of Search .................... 356/32, 33, 34, 73.1; 73/800, 786; 250/227; 350/96.23

[56] References Cited

FOREIGN PATENT DOCUMENTS 2063503 5/1981 United Kingdom .

OTHER PUBLICATIONS

"Measurement of Strain Relief in an Experimental Optical Fibre Cable," *Electronics Letters*, vol. 18, G. R. Bandurek et al., 1982, pp. 263-265.
"Single-Ended On-Line Extrusion-Coating Induced Strain Measurements in Optical Fibers Using Phase Delay," *3rd International Conference on Integrated Optics and Optical Communication*, R. Kashyap et al., 1981, (One page).
"Strain Measurement in Optical Fiber Cable Using Resistance Wire," *Japanese Journal of Applied Physics*, vol 20, 1981, Y. Katsuyama et al., pp. 25-30.
"Measurements of Strain in Optical Fiber Cables Using a Commercial Distance Meter," *8th European Conference on Optical Communication*, D. L. Philen et al., 1982, (4 pages).
"Electronic Distance Measurement for Industrial and Scientific Applications," *Hewlett-Packard Journal*, D. E. Smith, 1980, pp. 2-19.

Primary Examiner—Vincent P. McGraw
Assistant Examiner—S. A. Turner
Attorney, Agent, or Firm—James H. Fox

[57] ABSTRACT

Compressive strain in cabled optical fibers can cause buckling of the fibers and resulting microbending loss. To measure the longitudinal compression in cabled optical fibers, a modulated laser beam is directed through a first fiber and looped back to the origin by a second fiber. Next, the cable is stretched until tensile strain is indicated by a change in phase of the modulated signal. The amount of stretching required indicates the degree of compression on the fibers in the unstretched cable, and hence the amount of excess length of fiber in the cable. To measure excess fiber in relatively long lengths of cable, a portion of the cable can remain reeled, and the strain applied to the unreeled portion. A correction factor can be determined for slippage between the fiber and sheath in the reeled portion.

8 Claims, 3 Drawing Figures

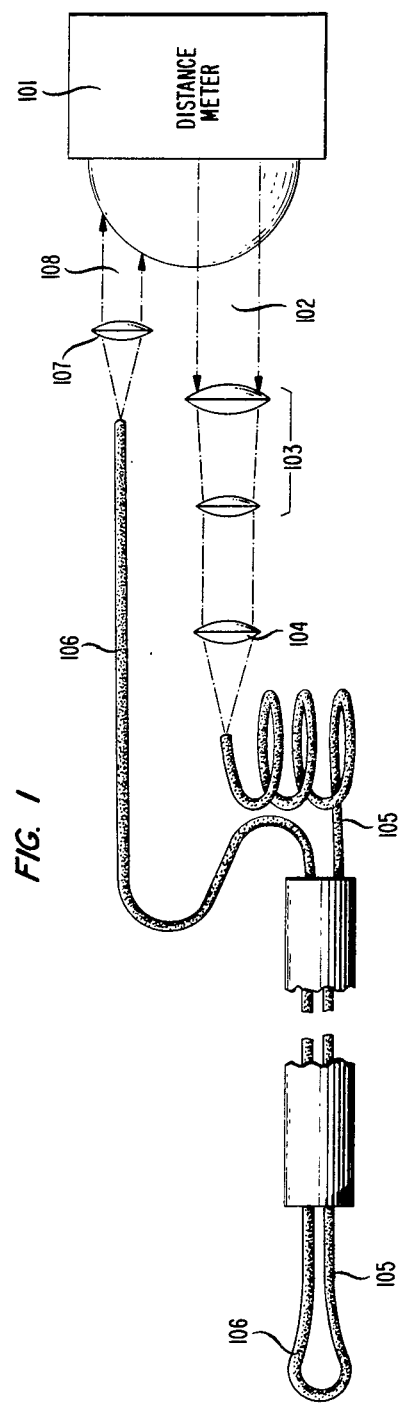
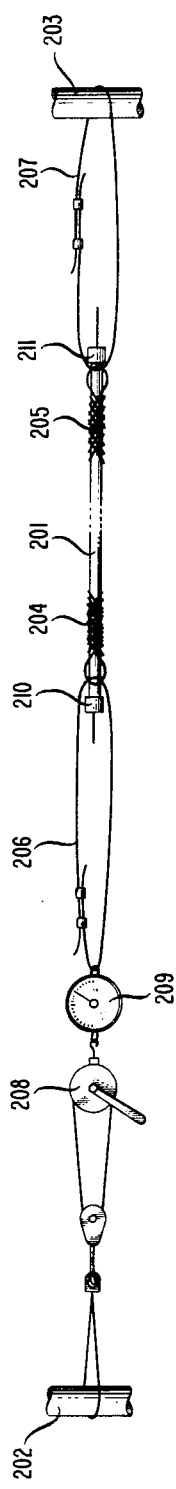
FIG. 1
FIG. 2

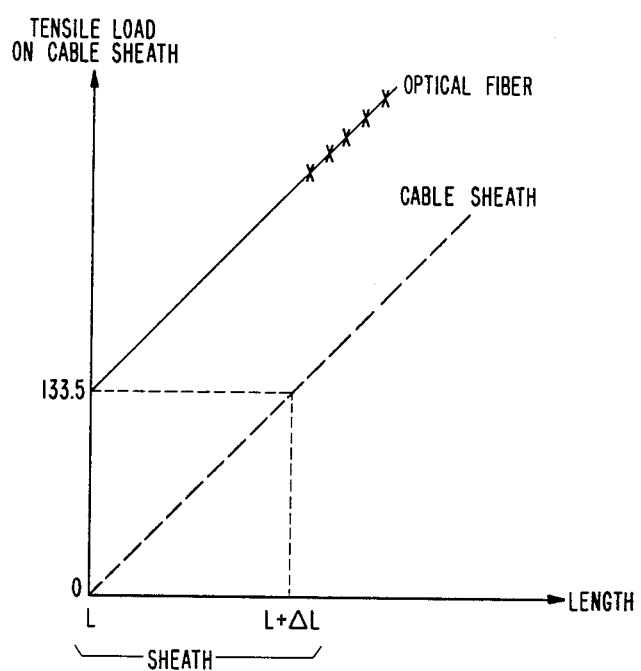

4,555,175

MEASURING COMPRESSION OF CABLED OPTICAL FIBERS

BACKGROUND OF THE INVENTION

1. Field of the Invention

The present invention concerns a method of measuring the excess length of optical fibers in an optical fiber cable.

2. Description of the Prior Art

In the design of an optical fiber cable, the fiber strain is a limiting factor on the tensile load capacity. Therefore, a small amount of excess optical fiber, typically about 0.07 percent, is included to ensure that the fibers are not under tension in the manufactured cable. However, too much fiber results in an excess loss from microbending. In the prior art, to ensure that the manufacturing tolerances are not resulting in an excess amount of fiber being included in the cable, a small percentage of the manufactured cables is first measured for length and then split open, with the optical fibers being removed. The length of the fibers in an uncompressed, straightened state is then measured. However, this is a destructive testing technique and hence requires that a finished optical fiber cable must be sacrificed.

Clearly, a nondestructive method of measuring excess optical fiber in a cable is very desirable. Methods are known by which the tensile strain on an optical fiber can be measured. For example, a pulse-delay method may be utilized which determines the transit time of an optical pulse before and after a strain is applied. It is also known to measure strain in an optical fiber by the use of the phase change of an optical signal that propagates through the fiber. In that technique, an optical source is modulated, and the optical signal is propagated through the fiber. The phase difference in the signal at the other end of the fiber is compared to an internal reference. This technique has also been used to measure compressive strain in an optical fiber; see, for example, "Single-Ended On-Line Extrusion-Coating Induced Strain Measurements in Optical Fibers Using Phase Delay," by R. Kashyap et al in *Proceedings Of The Third International Conference On Integrated Optics And Optical Communication (San Francisco), April* 1981. However, that technique is suitable only to the extent that the fiber can withstand a compression without buckling. It is suitable, for example, in a manufacturing operation wherein a relatively thick coating is applied to a fiber that helps prevent buckling during the manufacturing process, which can occur, for example, when the coating material shrinks longitudinally on the fiber. However, in the cabling process, once the fiber buckles there is substantially no further compression on the fiber, and hence the above technique yields no useful information on the degree of buckling of a fiber in a cable.

SUMMARY OF THE INVENTION

We have invented a method of measuring the amount of excess length of optical fiber in an optical fiber cable. In the present technique, an optical signal is directed from a source into one end of a first fiber and returned to the origin, typically through a second optical fiber, or by a reflective surface on the first fiber. The time of propagation, or alternatively, the phase shift, of the optical signal is first measured with the cable in an unstressed state. The cable is next placed under increasing longitudinal tensile stress while monitoring the optical signal to determine when the optical fiber is undergoing tensile stress. The resulting elongation of the optical fiber cable that produces the initial strain in the optical fiber gives a measure of the excess amount of optical fiber length in the cable. In performing the measurement on a reeled cable, a portion of the cable can remain mounted on the reel, and the strain applied to the unreeled portion.

BRIEF DESCRIPTION OF THE DRAWING

FIG. 1 shows an optical strain measuring technique suitable for use with the present invention;

FIG. 2 shows a test setup for applying stress to an optical fiber cable; and

FIG. 3 shows strain on both an optical fiber and an optical fiber cable as a function of tensile load applied thereto.

DETAILED DESCRIPTION

The following detailed description refers to a method of measuring the amount of excess length of optical fiber in an optical fiber cable. The technique is especially applicable for use with the so-called filled cables, wherein a flexible waterproofing compound fills the interstices of a cable and couples the optical fibers therein to the cable sheath. In the manufacturing process of such cable, if any shrinkage of the cable sheath occurs, this shrinkage will be transmitted through the filling compound to the optical fibers. Hence, the optical fibers can buckle, leading to increased losses due to microbending. However, the present technique is generally applicable to optical fiber cable designs wherein it is desired to determine the excess length of fibers in the cable.

In the present technique, the optical fiber cable is stressed while monitoring by optical methods the resulting strain in an optical fiber. The elongation of the cable is determined at the moment wherein a tensile strain on the optical fiber is indicated; that is, until the buckled fiber straightens out, there is substantially no longitudinal strain on the optical fiber. It is only when the cable sheath exceeds the length of the optical fiber therein that a strain is induced in the fiber. By suitable monitoring techniques, the resulting strain can be monitored during the stressing of the optical fiber cable. The strain can be applied to an entire length of cable. Alternately, a portion of the cable can remain reeled, and the strain applied to the unreeled portion. The latter method is especially advantageous for testing a long cable, where straining the entire length is not feasible. Nondestructive testing can thus be accomplished on optical fiber cables of practically any length.

A suitable implementation of the present method is with the adaption of a Hewlett-Packard Company HP-3850A industrial distance meter to optical fibers. This device measures distance in air for surveying or positioning purposes to an accuracy of a few millimeters in several kilometers. It uses a laser diode of about 1.4 mw power at a wavelength of 840 nm. The diode is modulated at 15 MHz, 375 KHz, and 3.75 KHz. The HP-3850A measures the phase shift of each modulation frequency to measure distance in air. In normal use it measures the distance in air to a retroreflector target, and the corresponding modulation wavelengths are 10 m, 400 m, and 40 km. The phase of the received signal varies from 0 to $2\pi$ radians with respect to the transmitted signal. Counters keep track of the number of $2\pi$ intervals for each modulation frequency, allowing the distance meter to keep track of each modulation distance and merge them into one distance reading.

Referring to FIG. 1, the HP-3850A distance meter (101) is adapted to measure the length of an optical fiber as follows: The diameter of the transmitted beam (102) from the instrument is nearly 2 inches, and this beam must be focused on the face of an optical fiber. The beam diameter is first reduced with the help of a 10× collimating telescope (103) and then focused onto the face of the fiber (105) with a 20× microscope objective (104). The distance meter normally operates with a retroreflector for a return path. In the present method, an alternate return path is typically provided for the fiber. This can be done by fusion splicing the transmitting fiber (105) to another fiber (106) in the cable. An alternate method is to chemically grow a reflecting mirror on the far end of the transmitting fiber. The return fiber output is collimated by a 10× microscope objective (107) to form a parallel beam (108) which is directed into the receiver lens of the distance meter. Because the HP-3850A normally measures distance to a retroreflector, the distance indicated is one-half of the total fiber length, or the length of the cable plus the additional fiber at each end.

The distance as determined by the meter assumes that the light beam travels in air, but in an optical fiber the light travels slower by a factor of the effective group refractive index. Hence, the distance measured in the fiber is longer by the factor of the refractive index and must be corrected accordingly. To determine an absolute distance to within the resolution of the instrument, the fiber's index of refraction must be known to one part in $10^5$. Unfortunately, the index of refraction is rarely known to better than one part in $10^3$. However, by making a relative measurement under varying load conditions, the ratio of the change in length to the original length (strain) can be determined to within the accuracy of the distance meter.

A change of the refractive index in an optical fiber caused by external forces was investigated by K. Nagano et al; see "Change of the Refractive Index in an Optical Fiber Due to External Forces," *Applied Optics*, Vol. 17, No. 13, pages 2080-2085 (1978). An additional effect that must be taken into account is the strain-optic coefficient:

$$\Delta \tau = (L/C)\Delta N + (N/C)\Delta L \qquad (1)$$

(See, for example, "Elongation of Optical Fibers in an Optical Cable Under Installation," R. Yamauchi et al, *Proceedings of the 4th European Conference on Optical Fibers*, Geneva (1978).) The observed delay ($\Delta \tau$) is a composite of the change in the refractive index term ($\Delta N$) and the change in the length ($\Delta L$), where C is the velocity of light in free space. The $\Delta N$ term is negative and contributes about 32 percent of the observed delay. This makes the observed delay (or change in length) appear to be too small. Thus, the measured delay should be increased by a factor of 1.32 to obtain the true change in length, $\Delta L$.

To make strain measurements on an optical fiber cable, two fibers are selected for the test, one representing the transmitted path and the other the return path. At the far end of the cable, the same two fibers are fusion spliced together to complete the loop. A five-turn wrap on a 20 mm diameter mandrel is used on the transmitting fiber to obtain a more uniform modal power distribution. Both fibers are held in vacuum chucks on x-y-z positioners at the transmitting and receiving ends. A base line measurement is then made to obtain a reference length. The distance meter provides a direct readout of the distance as if it were measured in air. The reading is then corrected for the index of refraction and the strain-optic coefficient. At the higher resolution ($\pm 1$ mm), distance measurements can be made every 15 seconds; and at the lower resolution ($\pm 10$ mm), measurements can be taken every 2 seconds. Continuous length measurements may then be made while applying tension to the cable sheath. By clamping the cable sheath onto the fibers in the vicinity of the ends of the cable, the tension is thereby also transmitted to the optical fibers. Since the setup does not need to be adjusted after the initial alignment, continuous measurements are possible as the strain progresses. The meter may be controlled with a calculator to provide unattended measurements over long periods of time.

The foregoing principles will be more fully illustrated by means of the following Example:

EXAMPLE

A 48 fiber, 28.8 m (94 feet) long filled cable was used in the strain experiments. The fibers were arranged into 4 ribbons of 12 fibers per ribbon. The cable was of the type described in U.S. Pat. No. 4,241,979, coassigned with the present invention. The core was filled with a rubber block copolymer-based filling compound; see U.S. Pat. No. 4,259,540, also coassigned herewith. FIG. 2 shows the schematic of the experimental setup. The cable (201) was unreeled along the ground, and both ends were anchored to metal posts (202, 203) using Kellems TM grips (204, 205) and wire ropes (206, 207). On one end, a tensioning device (208) and Dillon dynamometer (209) (8.9 kN, 2000 pounds max.) were installed between the metal post and the Kellems grip. Two ribbon clamps (210, 211) were used to clamp the fibers to the cable sheath in the vicinity of the ends of the cable so that no slippage occurred. Two fibers in a single ribbon were selected for the strain measurement. The fibers were looped back by a fusion splice on the anchor end, and jumper fibers were fusion spliced to each of the fibers on the tension end. This provided a transmit and receive path for an optical beam for the above optical strain measurement equipment (not shown).

Referring to FIG. 2, initially the cable was tensioned to about 30 pounds to make it straight on the ground, and an initial length measurement was made. The fiber was then stressed in 20 increments, each at an additional load of about 30 pounds. The resulting fiber strain was measured with the above-noted optical technique after each additional load to the cable was applied. Referring to FIG. 3, a least-squares fit was performed to the last 5 data points, as these were the most linear. This resulted in an intercept of 133.55 pounds. By the use of this intercept technique, a more accurate determination of the point at which tensile load is initially applied to the fibers after the buckling is removed can be made. From the intercept point, a line is drawn over to the cable sheath elongation line, as indicated, which was determined from previous experiments. At 133.55 pounds, which corresponds to a cable sheath strain of 0.077 percent, it is thus calculated that the elongation of the cable sheath, referred to as $\Delta L$ in FIG. 3, is approximately 0.87 inches. This therefore represents the amount of excess optical fiber in the unstressed cable.

While the above-noted modulated optical signal provides sufficient accuracy for practicing the present invention, other optical techniques are possible. For example, the above-noted pulse technique can be used, although at typically somewhat less accuracy. Furthermore, rather than looping the signal back from an optical fiber through a second optical fiber to the origin, a reflective coating can be placed on a single fiber and a reflection used for the return signal.

The above instrumentation is not degraded in accuracy for measuring excess length of fibers that initially buckle at a compressive longitudinal strain of about 0.005 percent or less. For typical silica optical fibers having an outside diameter of 125 micrometers, the maximum compressive strain they can support without buckling is roughly $6 \times 10^{-6}$, and hence are accurately measured by the inventive technique.

The above embodiment is useful for relatively short lengths of cable, up to perhaps a few hundred feet in length. However, optical fiber cable frequently exceeds lengths that can conveniently be strained. An advantage of the present technique is that long lengths of cable can remain on a reel, and the inventive method practiced on the unreeled length. That is, the reeled portion serves as an anchored end, and the strain is applied between the reel and the unreeled end. A clamp is typically applied to prevent slippage between the fiber and the cable sheath in the vicinity of the unreeled end, as before. However, some slippage between the fiber and the cable sheath will typically occur in the reeled portion, where clamping is typically not feasible. The slippage is due to the fact that the stress on the unreeled fiber is transmitted to the reeled portion to some extent, thus providing an effective strained length somewhat in excess of the unreeled length. The slippage error results from (1) excess fiber in the reeled portion, and (2) movement of fiber in the reeled portion toward the innermost portion of the loop described by the cable core. This error can be accounted for in a variety of ways. One way is to first apply the strain to a first unreeled portion, say 100 feet, and record the data as above. A longer portion, say 200 feet, is then unreeled, and strain applied and data taken. An error factor can then be deduced, on the assumption that the error due to the remaining reeled cable is the same in both cases. In addition, once this error factor is determined, subsequent cables can be measured using only one unreeled length, as above.

All such uses of the teaching by which the present invention has advanced the art are within the scope of the present invention.

What is claimed is:

1. A method of measuring the excess length of optical fiber in an optical fiber cable characterized by applying a stress to said cable along its longitudinal axis while optically monitoring the longitudinal strain applied to at least one fiber in said cable, increasing the magnitude of said stress at least until said fiber is subjected to a tensile strain, determining the tensile strain applied to said cable for which said fiber is initially subjected thereby to a tensile strain, and thereby determining said excess length of said fiber.

2. The method of claim 1 wherein said optically monitoring the strain on said optical fiber is accomplished by directing a modulated laser signal through a near end of a first optical fiber in said cable, returning said signal from the far end of said cable to the vicinity of said near end, and comparing the phase of the returned signal to the aforesaid modulated laser signal.

3. The method of claim 2 wherein said returning of said signal from the far end is accomplished by means of a second optical fiber in said cable.

4. The method of claim 2 wherein said returning of said signal from the far end is accomplished by means of a reflective surface on said first fiber.

5. The method of claim 1 wherein substantially the entire length of said cable is stressed.

6. The method of claim 1 wherein only a portion of said cable is substantially stressed, with the remaining portion residing on a reel during said stressing.

7. The method of claim 1 wherein said cable is a filled optical fiber cable comprising flexible waterproofing material that couples at least one optical fiber to the sheath of said cable.

8. The method of claim 1 wherein said fiber in said sheath initially buckles at a compressive longitudinal strain of 0.005 percent or less.

* * * * *